(12) United States Patent
Iwamoto et al.

(10) Patent No.: US 12,286,300 B2
(45) Date of Patent: Apr. 29, 2025

(54) TRANSPORT SYSTEM, TRANSPORT METHOD, AND TRANSPORT PROGRAM

(71) Applicant: TOYOTA JIDOSHA KABUSHIKI KAISHA, Toyota (JP)

(72) Inventors: Kunihiro Iwamoto, Nagakute (JP); Yuta Itozawa, Nagoya (JP); Hirotaka Komura, Tokyo (JP); Yutaro Takagi, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 606 days.

(21) Appl. No.: 17/650,897

(22) Filed: Feb. 14, 2022

(65) Prior Publication Data

US 2022/0258976 A1 Aug. 18, 2022

(30) Foreign Application Priority Data

Feb. 16, 2021 (JP) ................. 2021-022733

(51) Int. Cl.
*B65G 1/137* (2006.01)
*B65G 1/06* (2006.01)
*B62B 1/00* (2006.01)
*B65G 1/04* (2006.01)

(52) U.S. Cl.
CPC ........... *B65G 1/1371* (2013.01); *B65G 1/065* (2013.01); *B62B 1/00* (2013.01); *B65G 1/0407* (2013.01)

(58) Field of Classification Search
CPC .... B65G 1/1371; B65G 1/065; B65G 1/0407; B62B 1/00
See application file for complete search history.

(56) References Cited

U.S. PATENT DOCUMENTS

| | | | |
|---|---|---|---|
| 10,769,581 B1* | 9/2020 | Brazeau | G06Q 10/087 |
| 2007/0021864 A1* | 1/2007 | Mountz | G06Q 10/087 |
| | | | 700/216 |
| 2014/0100715 A1* | 4/2014 | Mountz | B65G 1/1378 |
| | | | 701/2 |
| 2015/0353282 A1* | 12/2015 | Mansfield | G06Q 10/087 |
| | | | 700/214 |
| 2016/0132059 A1* | 5/2016 | Mason | B25J 9/1697 |
| | | | 701/28 |
| 2016/0236869 A1* | 8/2016 | Kimura | B65G 1/1378 |
| 2018/0060764 A1* | 3/2018 | Hance | G06Q 10/043 |
| 2018/0082162 A1* | 3/2018 | Durham | B65G 1/1375 |
| 2018/0265297 A1* | 9/2018 | Nakano | B65G 1/1373 |
| 2020/0357040 A1* | 11/2020 | Patel | G06Q 30/0639 |

FOREIGN PATENT DOCUMENTS

| | | |
|---|---|---|
| CN | 110980081 A | 4/2020 |
| JP | H01176707 A | 7/1989 |
| JP | 2020196106 A | 12/2020 |
| WO | 2015/052825 A1 | 4/2015 |

* cited by examiner

*Primary Examiner* — Kyle O Logan
(74) *Attorney, Agent, or Firm* — Dickinson Wright, PLLC

(57) ABSTRACT

A transport system includes a transport robot and a plurality of kinds of loading platform portions each of which is able to be connected to the transport robot. The transport system includes: a determination unit that determines a loading platform portion to which the transport robot is to be connected, from the plurality of kinds of loading platform portions, based on a transport condition; and a connection control unit that controls a connecting operation between the transport robot and the loading platform portion determined by the determination unit.

4 Claims, 8 Drawing Sheets

TRANSPORT SYSTEM, TRANSPORT METHOD, AND TRANSPORT PROGRAM

CROSS-REFERENCE TO RELATED APPLICATION

This application claims priority to Japanese Patent Application No. 2021-022733 filed on Feb. 16, 2021, incorporated herein by reference in its entirety.

BACKGROUND

1. Technical Field

The present disclosure relates to transport systems, transport methods, and transport programs.

2. Description of Related Art

Japanese Unexamined Patent Application Publication No. 2020-196106 (JP 2020-196106 A) discloses a transport system having an accommodating device and a robot that can be freely connected and disconnected.

SUMMARY

According to the technique described in JP 2020-196106 A, there is a problem that a load may not fit in the accommodating device and may not be transported depending on the size of the load.

The present disclosure has been made to solve such a problem, and an object of the present disclosure is to provide a transport system, a transport method, and a transport program that transports a load using a loading platform portion in accordance with a transport condition.

A transport system according to the present embodiment is a transport system including a transport robot and a plurality of loading platform portions each of which is able to be connected to the transport robot, in which the transport system includes: a determination unit that determines a loading platform portion to which the transport robot is to be connected, from the plurality of kinds of loading platform portions, based on a transport condition; and a connection control unit that controls a connecting operation between the transport robot and the loading platform portion determined by the determination unit.

A transport method according to the present embodiment is a transport method of a transport system including a transport robot, and a plurality of kinds of loading platform portions each of which is able to be connected to the transport robot. The transport method includes: a determining step of determining a loading platform portion to which the transport robot is to be connected, from the plurality of kinds of loading platform portions, based on a transport condition; and a connection control step of controlling a connecting operation between the transport robot and the loading platform portion determined by the determining step.

A transport program in a transport system including a transport robot and a plurality of kinds of loading platform portions each of which is able to be connected to the transport robot, in which the computer is caused to execute: a determining step of determining a loading platform portion to which the transport robot is to be connected, from the plurality of kinds of loading platform portions, based on a transport condition; and a connection control step of controlling a connecting operation between the transport robot and the loading platform portion determined by the determining step.

According to the present disclosure, it is possible to provide a transport system, a transport method, and a transport program that transports a load using a loading platform portion in accordance with a transport condition.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, the present disclosure will be described through an embodiment of the disclosure, but the disclosure according to the scope of the claims is not limited to the following embodiment. Moreover, not all of the configurations described in the embodiment are indispensable as means for solving the problem.

Figure 1:
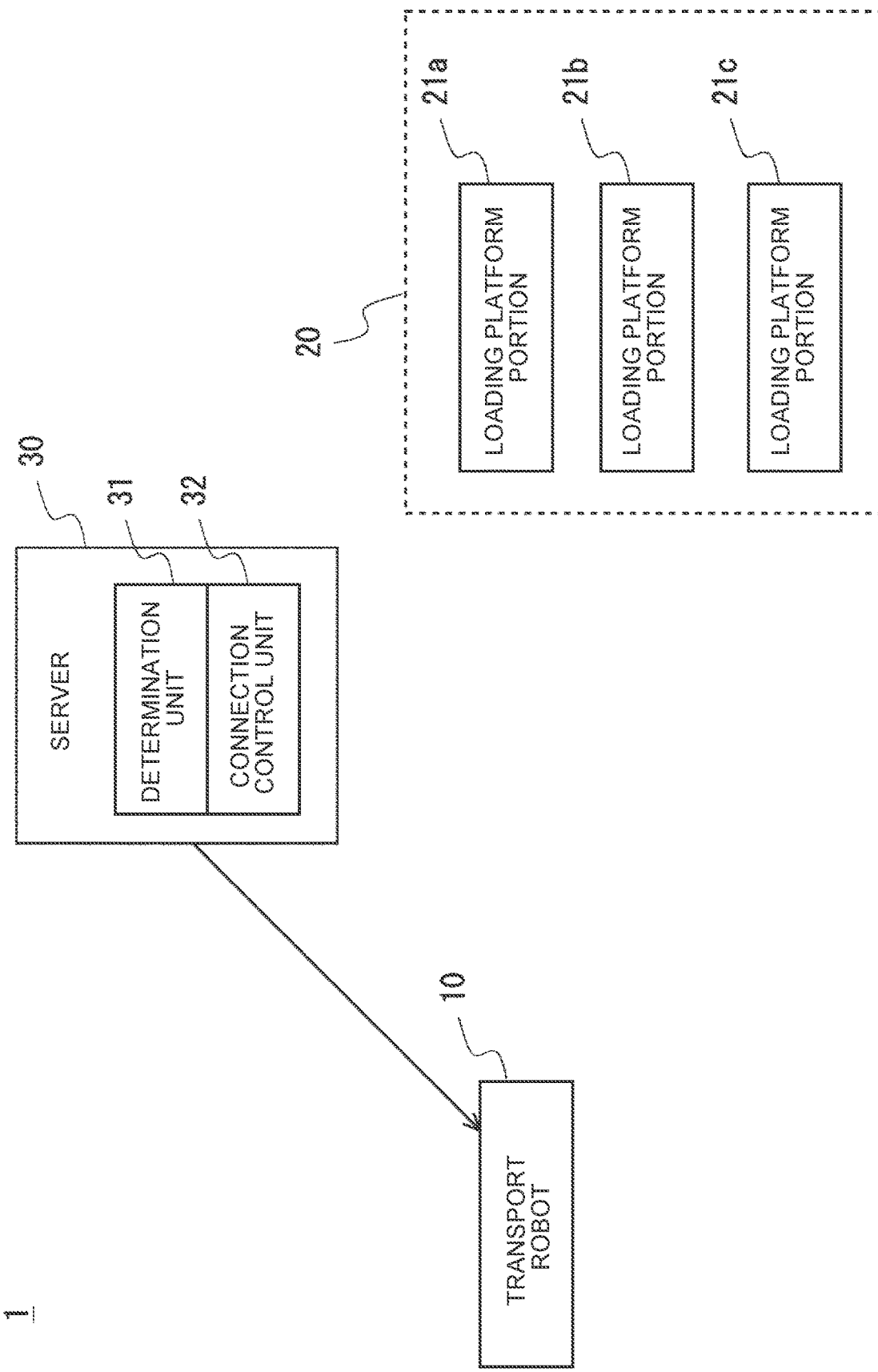
FIG. 1 is a block diagram showing a configuration of a transport system according to an embodiment.

A transport system according to the embodiment will be described with reference to the drawings. FIG. 1 is a block diagram showing a configuration example of a transport system 1 according to an embodiment. The transport system 1 shown in FIG. 1 includes a transport robot 10, a plurality of kinds of loading platform portions 20, and a server 30.

In FIG. 1, three kinds of the loading platform portion 20 that are a loading platform portion 21a, a loading platform portion 21b, and a loading platform portion 21c are shown as the plurality of the loading platform portions. However, the plurality of kinds of loading platform portions 20 may be two kinds or may be four kinds or more. The plurality of kinds of loading platform portions 20 may include a plurality of kinds of loading platform portions 21a and loading platform portions 21b. In the following, when the loading platform portion 21a, the loading platform portion 21b, and the loading platform portion 21c are not distinguished from each other, they may be referred to as the loading platform portion 21. That is, the elements included in the plurality of kinds of loading platform portions 20 are referred to as the loading platform portion 21.

The transport system 1 is a system in which the transport robot 10 is connected to the loading platform portion 21 to transport the load. The transport robot 10 is an autonomous mobile body, and for example, autonomously moves along a transport path generated by the server 30. The transport robot 10 may generate a transport path by itself to perform autonomous movement. Thus, a system that does not include the server 30 may also be included in the transport system 1 according to the embodiment.

The plurality of kinds of loading platform portions 20 is installed at a delivery source such as a warehouse. The delivery source may be equipped with an accommodating device such as a rack that accommodates the transportation target (for example, delivery). The transport robot 10 is connected to the loading platform portion 21 and conveys the items stored in the loading platform portion 21.

The transport robot 10 is configured to be connectable to the loading platform portion 21. The transport robot 10 may be connected to one loading platform portion 21 or may be connected to two loading platform portions 21. For example, the transport robot 10 may be connected to the loading platform portion 21 both in front of and behind the transport robot 10. Any configuration can be applied to the connecting mechanism, and for example, the connecting mechanism may be connected to the loading platform portion 21 by a claw member included in the transport robot 10. The configuration of the transport robot 10 will be described below.

Figure 2:
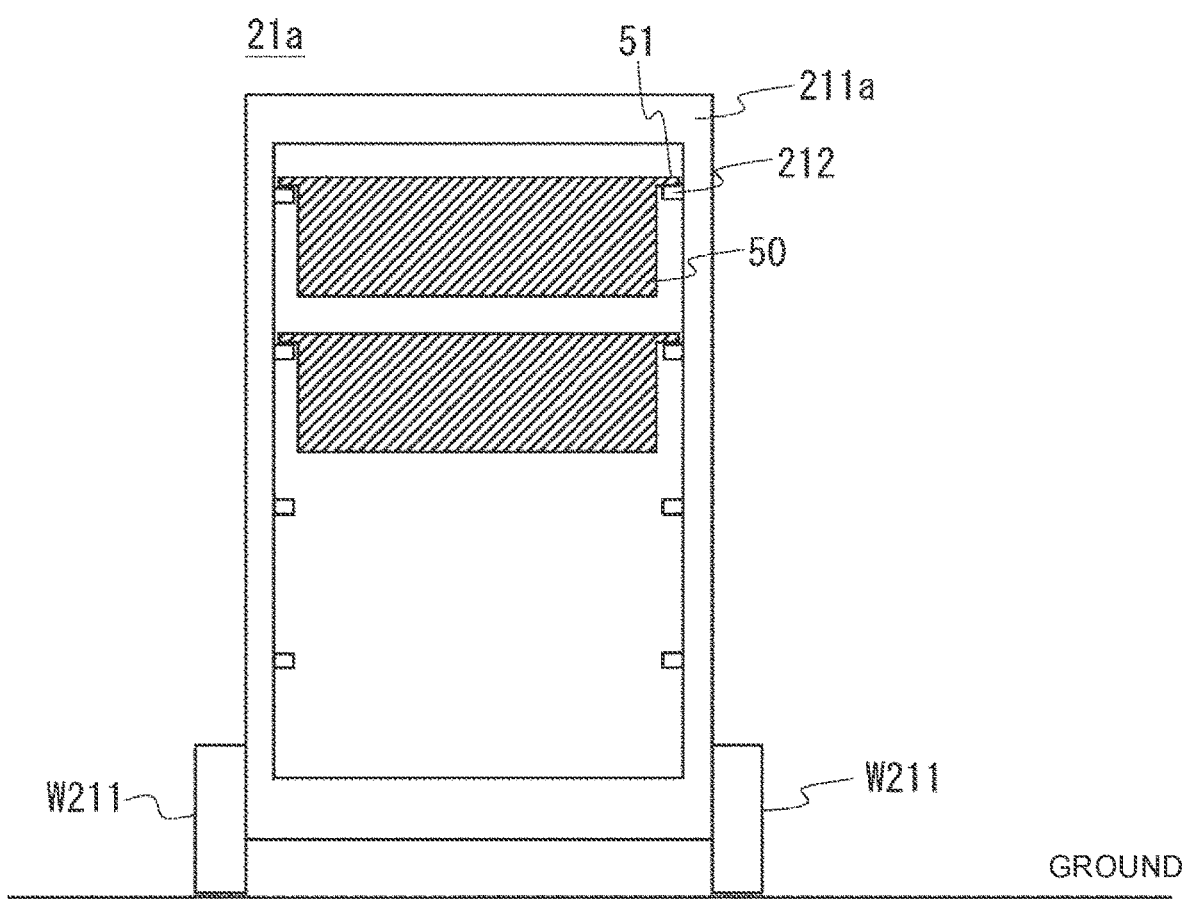
FIG. 2 is a schematic front view showing a configuration of a loading platform portion according to the embodiment.
Figure 3:
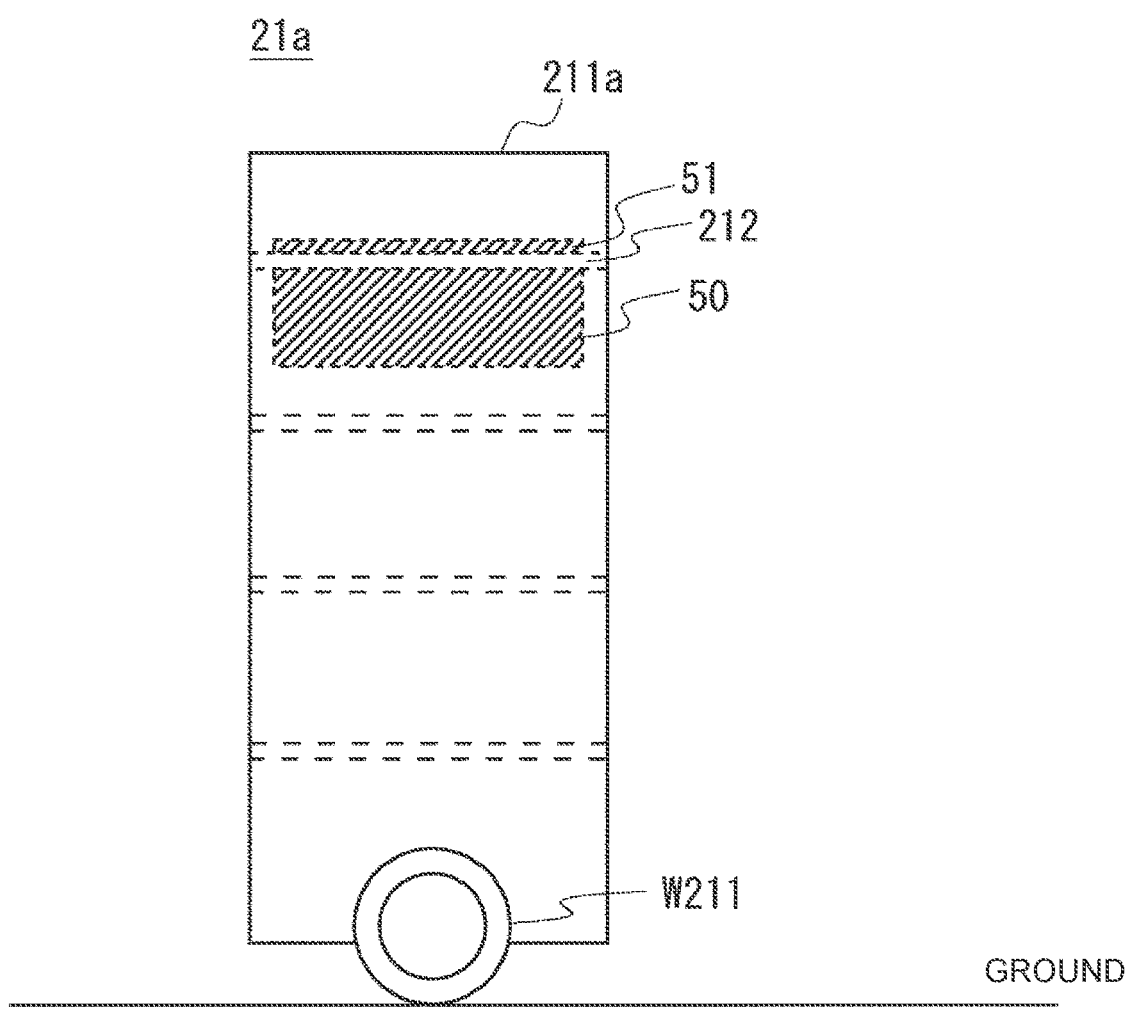
FIG. 3 is a schematic side view showing a configuration of the loading platform portion according to the embodiment.

The loading platform portion 21 is an accommodating device for accommodating the transported load. The loading platform portion 21a is also referred to as a rack. The configuration of the loading platform portion 21a will be described with reference to FIGS. 2 and 3. FIGS. 2 and 3 are a schematic front view and a schematic side view of the loading platform portion 21a, respectively. The loading platform portion 21a includes wheels W211, a housing 211a, and a pair of rails 212. The pair of wheels W211 is rotatably fixed to the lower side of the housing 211a. The wheels W211 may be driven wheels.

The housing 211a has, for example, a configuration in which a top plate, a bottom plate, a right side plate, a left side plate, and a back surface plate are formed integrally. That is, both of the side surfaces of the housing 211a are open such that the load 50 can be taken in and out. The housing 211a may further include leg portions (not shown) for allowing the loading platform portion 21a to stand on its own.

As shown in FIGS. 2 and 3, a plurality of pairs of rails 212 extend in the depth direction on the inner surface of the housing 211a and is arranged side by side at equal intervals in the height direction. Here, the rails 212 are provided so as to rise substantially vertically from the inner surface of the housing 211a. As shown in FIGS. 2 and 3, the load 50 can be taken in and out by sliding a protruding portion 51 on each of the rails 212 that face each other and that are adjacent to each other. The protruding portions 51 protrude outward from the load 50 in a width direction.

The plurality of kinds of loading platform portions 20 may include the loading platform portions 21a in which the number of the load 50 that can be accommodated are different from each other. For example, the distances between the rails 212 in the height direction may be equal to each other, and the height of the housings 211a may be different from each other. Further, the plurality of kinds of loading platform portions 20 may include the loading platform portions 21a in which the sizes of the load 50 that can be accommodated are different from each other. For example, the interval between the rails 212 in the height direction may be different from each other. Further, the width and the length in the depth direction of the housing 211a may be different from each other.

The transport system 1 may include an accommodating device having a fixed position. The accommodating device is installed in a warehouse or the like and is used to accommodate the delivered load in advance. The accommodating device may include the housing 211a and the rail 212, similarly to the loading platform portion 21a described above.

Figure 4:
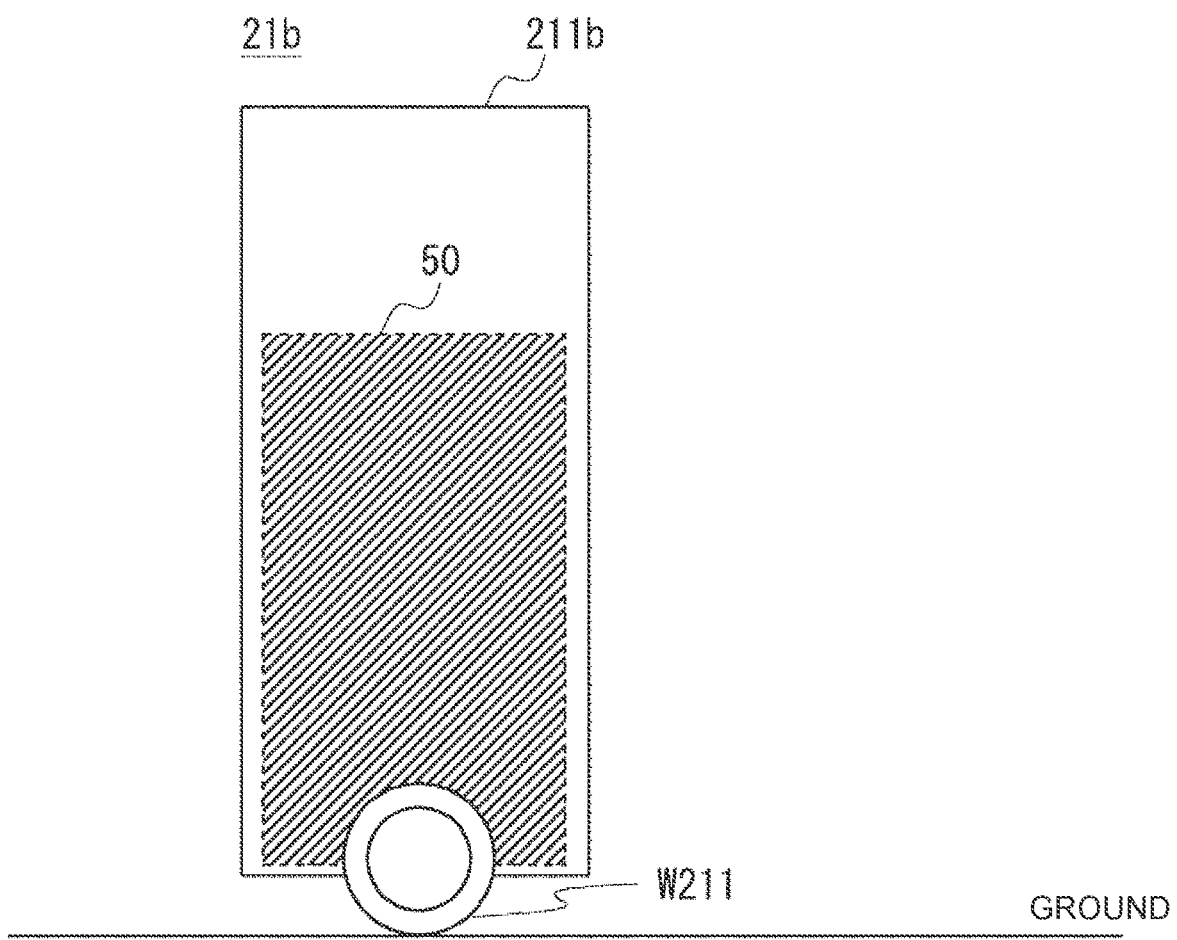
FIG. 4 is a schematic side view showing a configuration of the loading platform portion according to the embodiment.

The loading platform portion 21b is also referred to as a basket trolley. FIG. 4 is a schematic side view showing the configuration of the loading platform portion 21b. The loading platform portion 21b includes the wheels W211 and the housing 211b. The housing 211b has a basket-like shape, and can accommodate the load 50 inside the basket. For example, the upper surface of the housing 211b may be open so that the load 50 can be loaded. The plurality of kinds of loading platform portions 20 may include a plurality of kinds of loading platform portions 21b in which the sizes of the housings 211b are different.

Figure 5:
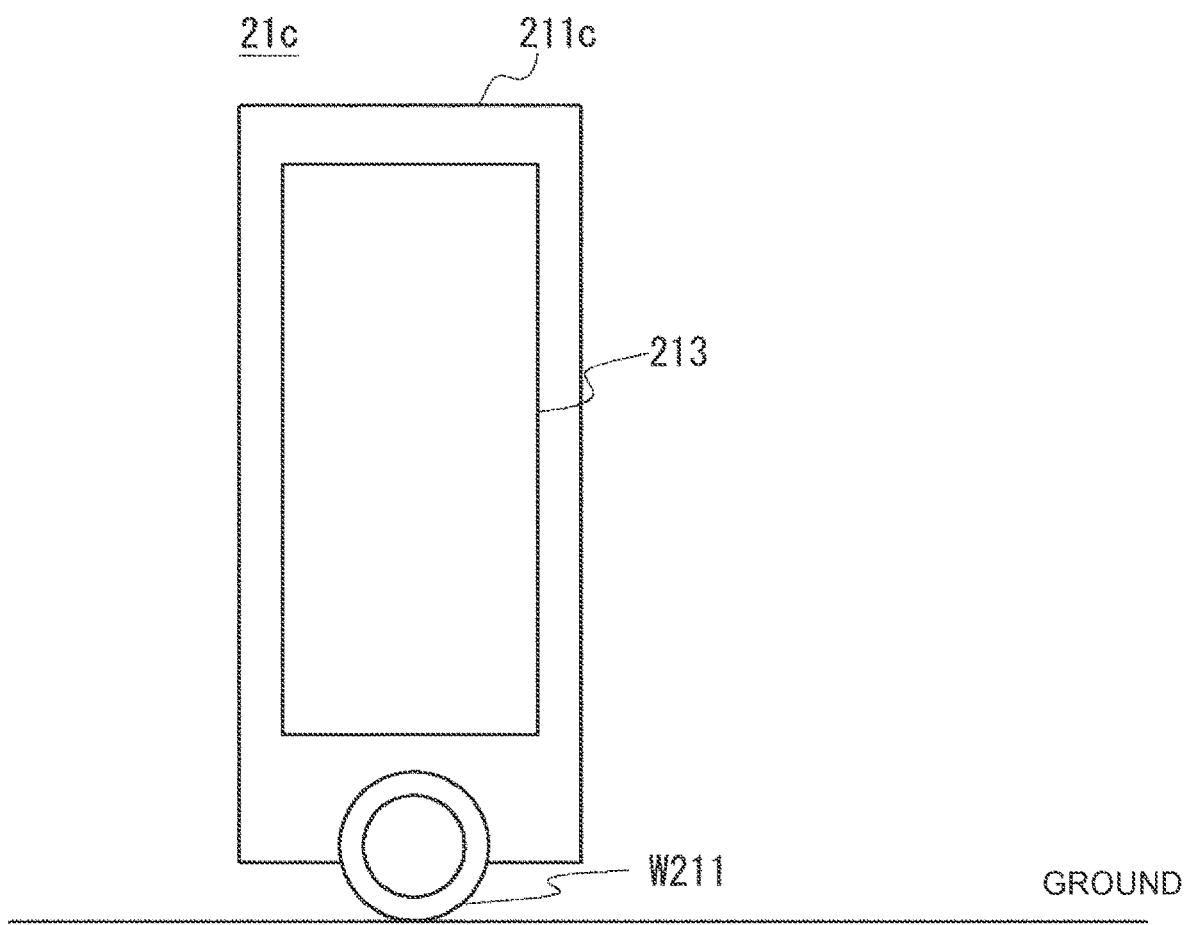
FIG. 5 is a schematic side view showing a configuration of the loading platform portion according to the embodiment.

Further, the loading platform portion 21c is a trolley to which a digital signage is attached. FIG. 5 is a schematic side view showing the configuration of the loading platform portion 21c. The loading platform portion 21c includes the wheels W211 and the housing 211c. The loading platform portion 21c may be provided with the rails 212 like the loading platform portion 21a, or may have a basket-like shape like the loading platform portion 21b. A digital signage 213 is attached to the housing 211c. The loading platform portion 21c causes the digital signage 213 to display an image in response to an instruction from the server 30. The video to be displayed may be, for example, for the purpose of promotion or advertisement.

The loading platform portion 21 is configured to be connectable to the transport robot 10 described later. The loading platform portion 21 may be connected to the transport robot 10 by using, for example, a claw member (not shown). The transport system 1 does not need to include all of the loading platform portions 21a, b, and c.

Figure 6:
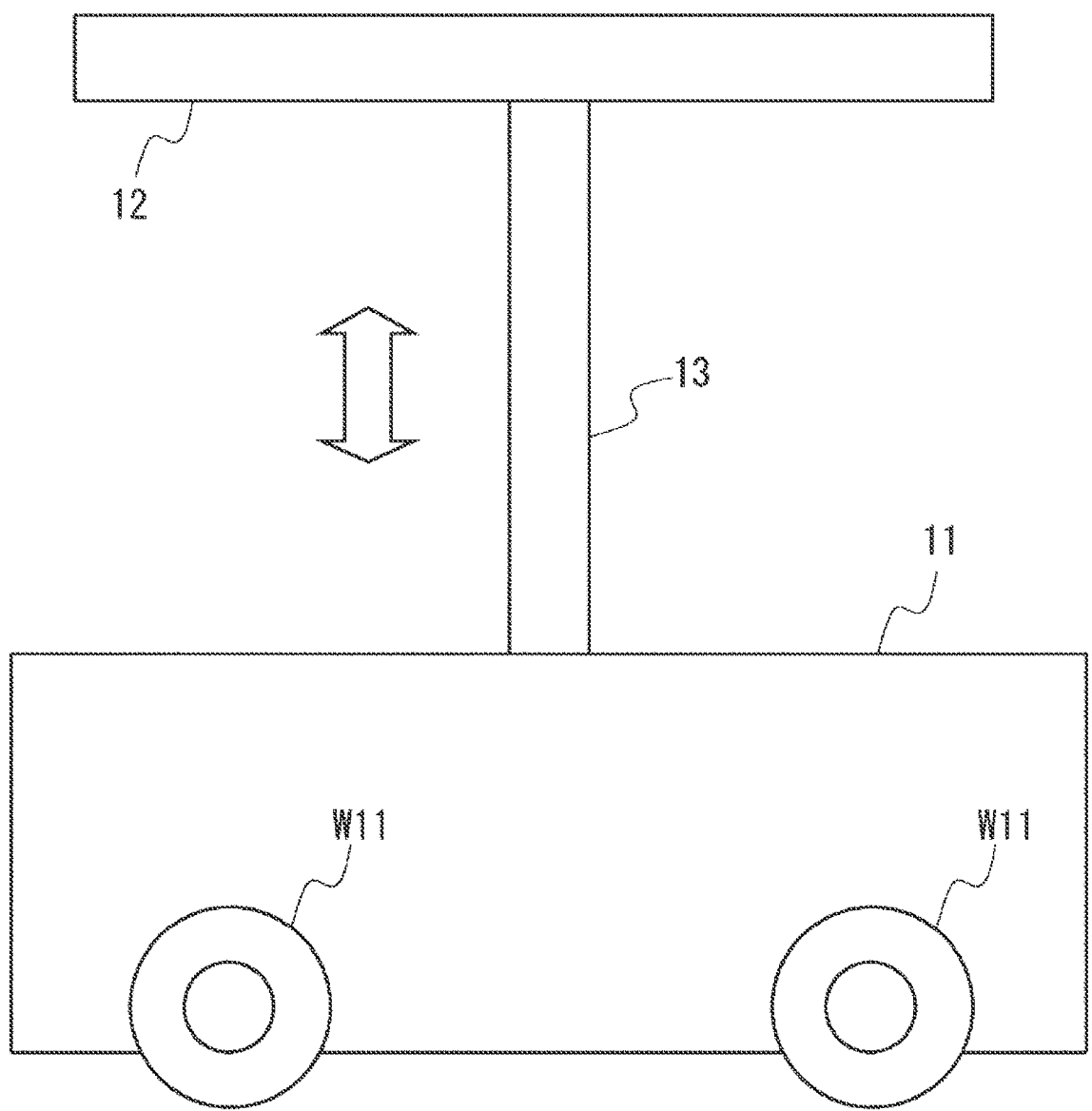
FIG. 6 is a schematic side view showing a configuration of a transport robot according to the embodiment.

Next, the configuration of the transport robot 10 will be described with reference to FIG. 6. FIG. 6 is a schematic side view of the transport robot 10. The transport robot 10 includes wheels W11, a main body portion 11, a top plate 12, and a support column 13. Two pairs of the wheels W11 are rotatably fixed to the lower side of the main body portion 11, and are driven by a drive source (not shown) such as a motor.

As shown in FIG. 6, the top plate 12 is connected to the main body portion 11 via the support column 13 capable of expanding and contracting. The top plate 12 is connected to the upper end of the support column 13, and the transport robot 10 places the load 50 on the top plate 12 and transports the load 50.

The support column 13 includes, for example, a telescopic type expansion-retraction mechanism, and is expanded and contracted by a drive source (not shown) such as a motor. As shown by the white arrow in FIG. 6, the height of the top plate 12 can be changed by changing the length of the support column 13. The transport robot 10 can use a manipulator (not shown) to take out the load 50 from an accommodation place installed in a warehouse or the like and accommodate it in one of a plurality of kinds of loading platform portions 20.

The transport robot 10 includes a control unit (not shown) that controls the operation of the support column 13, the operation of the two pairs of wheels W11, and the operation of the manipulator (not shown). The control unit (not shown) causes the transport robot 10 to perform an operation for connecting to the loading platform portion 21 in response to an instruction from the server 30.

The transport robot 10 may include a connecting mechanism (not shown) for connecting to the loading platform portion 21. For example, the transport robot 10 may be able to be connected to the loading platform portion 21 by operating a claw member or the like. Further, the transport robot 10 may perform a connecting operation by using the top plate 12 or the manipulator (not shown).

Next, returning to FIG. 1, the configuration of the server 30 will be described. The server 30 includes a determination unit 31 and a connection control unit 32.

The server 30 includes a calculation unit such as a central processing unit (CPU) and a storage unit such as a random access memory (RAM) and a read-only memory (ROM) in which various control programs and data are stored. That is, the server has a function as a computer, and performs the following process based on the above-mentioned various control programs and the like.

The determination unit 31 determines the loading platform portion 21 to which the transport robot 10 is connected, from the plurality of kinds of loading platform portions 20 based on the transport conditions. The transport conditions are, for example, conditions relating to the quantity of the load 50 to be transported and the size of the load 50 to be transported. Further, the transport condition may be a condition related to the transport route. Further, the transport condition may be a condition related to the provision of a service performed in association with the transport business. For example, the transport robot 10 may transport the load 50 while displaying an advertisement on the digital signage 213 of the loading platform portion 21c. The determination unit 31 may determine both the loading platform portion 21 that is to be connected to a front side of the transport robot 10 and the loading platform portion 21 that is to be connected to a rear side of the transport robot 10.

The determination unit 31 may determine the loading platform portion 21 to which the transport robot 10 is connected, for example, based on the transport conditions related to the quantity of the load 50 to be transported. For example, when a plurality of kinds of loading platform portions 20 include the loading platform portions 21a having different quantities of load that can be accommodated, the determination unit 31 may determine the loading platform portion 21a to which the transport robot 10 is connected in accordance with the quantity of the load to be transported. Specifically, when the number of the load 50 is equal to or greater than a threshold value, the determination unit 31 may determine the loading platform portion 21 to which the transport robot 10 is connected to be the loading platform portion 21a capable of accommodating a larger number of the load 50. Here, the threshold value may be the upper limit of the number of the load accommodated in the smaller loading platform portion 21a.

Further, the determination unit 31 may determine the loading platform portion 21 to which the transport robot 10 is connected, for example, based on the transport conditions related to the size of the load 50 to be transported. For example, when the size of the load 50 that can be accommodated by the loading platform portion 21b is larger than the size of the load 50 that can be accommodated by the loading platform portion 21a, the determination unit 31 may determine that the loading platform portion 21 to be connected by the transport robot 10 is the loading platform portion 21b when the size of the load 50 to be transported is larger than a predetermined size.

Further, the determination unit 31 may determine the loading platform portion 21 to which the transport robot 10 is connected, for example, in accordance with the unevenness on the transport route generated by the server 30. Here, it is assumed that the plurality of kinds of loading platform portions 20 include a plurality of kinds of loading platform portions 21 having different suspension performances. Further, when an image is displayed accompanying the transportation of the load 50, the determination unit 31 may determine that the loading platform portion 21 to which the transport robot 10 is connected is the loading platform portion 21c to which the digital signage 213 is attached.

The connection control unit 32 controls the connecting operation between the transport robot 10 and the loading platform portion 21 determined by the determination unit 31. The connection control unit 32 generates a traveling route based on the position of the determined loading platform portion 21 and the position of the transport robot 10, and transmits the travel route to the transport robot 10. Then, the transport robot 10 autonomously moves in accordance with the received traveling route, and executes the connecting operation with the loading platform portion 21. The transport robot 10 may perform the connecting operation using, for example, a claw member or the like. After the transport robot 10 is stopped in front of the loading platform portion 21, the transport robot 10 and the loading platform portion 21 may be connected by a human being operating the connecting mechanism.

Here, as described above, some or all of the processing of the determination unit 31 and the connection control unit 32 may be performed on the transport robot 10 side. Thus, the transport robot 10 may determine the loading platform portion 21 in accordance with the transport conditions and travel toward the determined loading platform portion 21.

Figure 7:
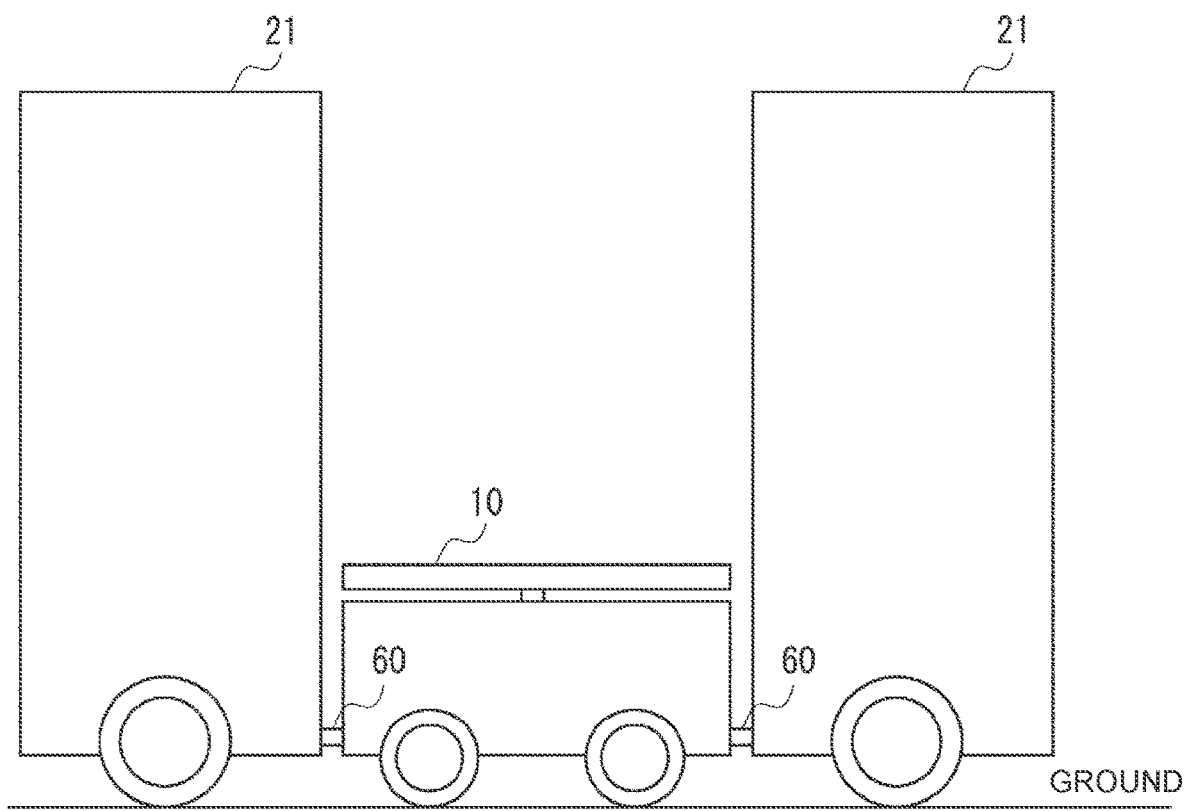
FIG. 7 is a schematic side view showing a state in which the transport robot and the loading platform portion according to the embodiment are connected.

FIG. 7 is a schematic side view showing a state in which the transport robot 10 and the loading platform portion 21 are connected to each other. In FIG. 7, the loading platform portion 21 is connected to both the front and the rear side of the transport robot 10, but the loading platform portion 21 may be connected to only one of the front and the rear. As described above, the configuration of a connecting mechanism 60 is arbitrary.

Figure 8:
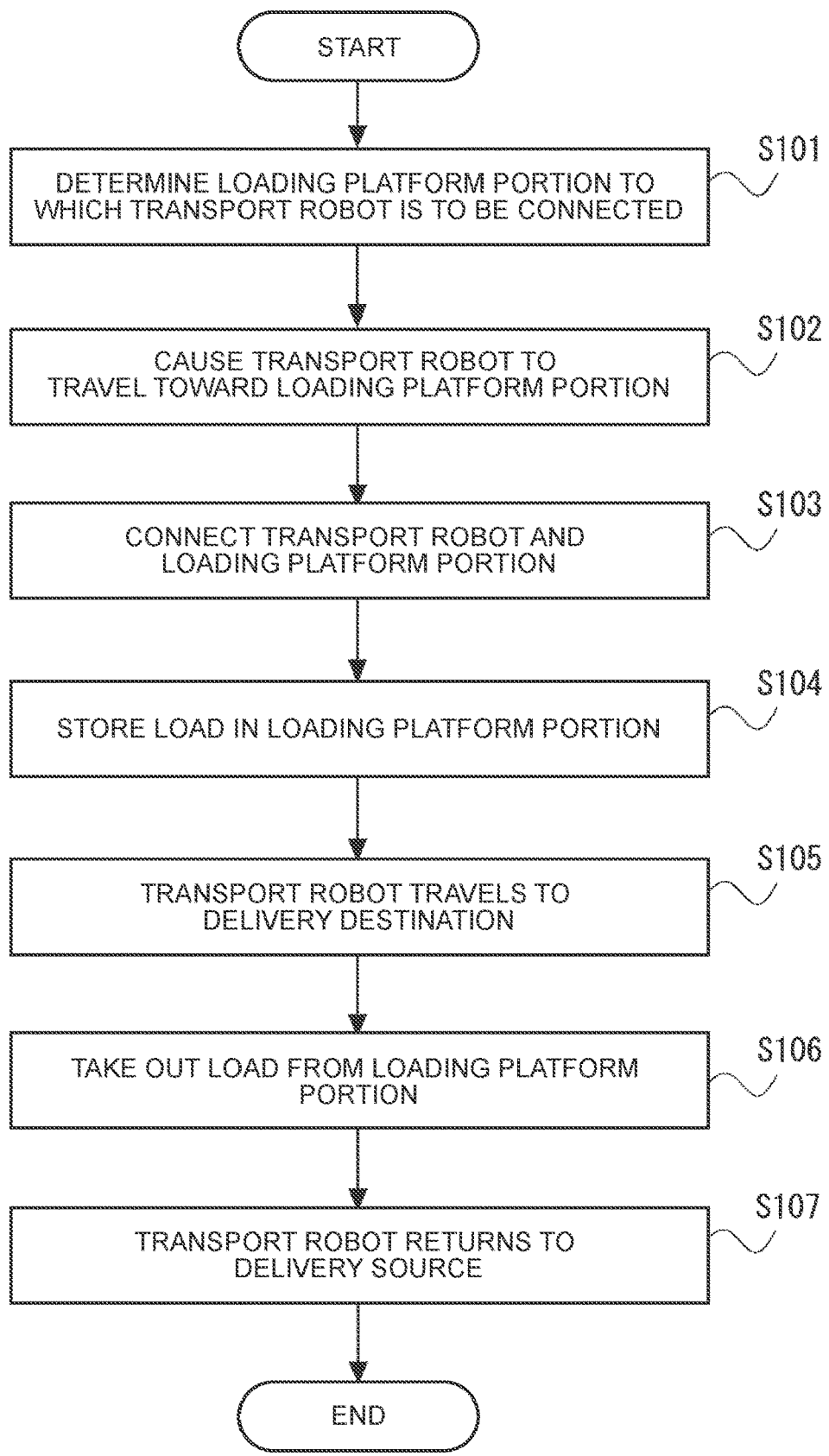
FIG. 8 is a flowchart illustrating a flow of a transport method according to the embodiment.

FIG. 8 is a flowchart illustrating a flow of a transport method according to the embodiment. First, the determination unit 31 of the server 30 determines the loading platform portion 21 to which the transport robot 10 is connected, from the plurality of kinds of loading platform portions 20 based on the transport conditions (step S101). The server 30 may determine, for example, the loading platform portion 21 to which the transport robot 10 is connected, based on the quantity of the load 50 to be transported and the size of the load 50.

Next, the connection control unit 32 of the server 30 causes the transport robot 10 to travel toward the loading platform portion 21 determined in step S101 (step S102). The transport robot 10 may generate a movement route to the loading platform portion 21 determined in step S101 and perform autonomous movement.

Next, the transport robot 10 is connected to the loading platform portion 21 determined in step S101 (step S103). In response to an instruction from the connection control unit 32 of the server 30, the transport robot 10 may perform an operation of connecting to the loading platform portion 21. Further, a human being may connect the loading platform portion 21 and the transport robot 10.

Next, the transport robot 10 stores the load 50 to be transported in the loading platform portion 21 using a manipulator (not shown) (step S104). The load 50 may be stored by a robot other than the transport robot 10 or by a human being.

Next, the transport robot 10 travels to the delivery destination in a state of being connected to the loading platform portion 21 (step S105). As a result, the transport robot 10 transports the load 50. The delivery route may be generated by the server 30.

Upon arriving at the delivery destination, the transport robot 10 takes out the load 50 from the loading platform portion 21 using a manipulator (not shown) (step S106) and stores it in a rack or the like installed at the delivery destination. The transport robot 10 may take out the load 50 after releasing the connection with the loading platform portion 21. A robot other than the transport robot 10 or a human being may take out the load 50. Finally, the transport robot 10 returns to the delivery source such as a warehouse (step S107). After returning to the delivery source, the transport robot 10 may release the connection with the loading platform portion 21. A human being may release the connection.

Hereinafter, the effects of the transport vehicle according to the embodiment will be described. The transport system according to the embodiment can transport the load after selecting an appropriate loading platform portion in accordance with the transport conditions such as the quantity and size of the load.

The present disclosure is not limited to the above embodiment, and can be appropriately modified without departing from the spirit.

What is claimed is:

1. A transport system including a transport robot, and a plurality of kinds of loading platform portions each of which is able to be connected to the transport robot, the transport system comprising:
 a determination unit that determines a loading platform portion to which the transport robot is to be connected, from the plurality of kinds of loading platform portions, based on a transport condition; and
 a connection control unit that controls a connecting operation between the transport robot and the loading platform portion determined by the determination unit;
 wherein the determination unit determines the loading platform portion to which the transport robot is to be connected, based on at least one of (1) a transport condition related to the number of transport targets, (2) a transport condition related to a size of the transport target, or (3) a digital signage attached to a loading platform of the plurality of kinds of loading platforms, when an image is displayed accompanying transportation of a load.

2. The transport system according to claim 1, wherein the determination unit determines a loading platform portion that is to be connected to a front side of the transport robot and a loading platform portion that is to be connected to a rear side of the transport robot.

3. A transport method in a transport system including a transport robot, and a plurality of kinds of loading platform portions each of which is able to be connected to the transport robot, the transport method comprising:
 a determining step of determining a loading platform portion to which the transport robot is to be connected, from the plurality of kinds of loading platform portions, based on a transport condition; and
 a connection control step of controlling a connecting operation between the transport robot and the loading platform portion determined by the determining step;
 wherein the determining step determines the loading platform portion to which the transport robot is to be connected, based on at least one of (1) a transport condition related to the number of transport targets, (2) a transport condition related to a size of the transport target, or (3) a digital signage attached to a loading platform of the plurality of kinds of loading platforms, when an image is displayed accompanying transportation of a load.

4. A non-transitory computer-readable storage medium in a transport system including a transport robot and a plurality of kinds of loading platform portions each of which is able to be connected to the transport robot,
 the non-transitory computer-readable storage medium storing code that causes a computer to execute:
 a determining step of determining a loading platform portion to which the transport robot is to be connected, from the plurality of kinds of loading platform portions, based on a transport condition; and
 a connection control step of controlling a connecting operation between the transport robot and the loading platform portion determined by the determining step;
 wherein the determining step determines the loading platform portion to which the transport robot is to be connected, based on at least one of (1) a transport condition related to the number of transport targets, (2) a transport condition related to a size of the transport target, or (3) a digital signage attached to a loading platform of the plurality of kinds of loading platforms, when an image is displayed accompanying transportation of a load.

* * * * *